United States Patent
Husted et al.

(10) Patent No.: US 11,617,175 B2
(45) Date of Patent: *Mar. 28, 2023

(54) INTELLIGENT BAND SELECTION FOR WIRELESS ACCESS POINT

(71) Applicant: Google LLC, Mountain View, CA (US)

(72) Inventors: Paul James Husted, San Jose, CA (US); Nihar Jindal, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/194,979

(22) Filed: Mar. 8, 2021

(65) Prior Publication Data

US 2021/0195592 A1 Jun. 24, 2021

Related U.S. Application Data

(63) Continuation of application No. 16/411,933, filed on May 14, 2019, now Pat. No. 10,973,028.

(Continued)

(51) Int. Cl.
*H04W 72/04* (2009.01)
*H04W 72/0453* (2023.01)
(Continued)

(52) U.S. Cl.
CPC ...... *H04W 72/0453* (2013.01); *H04B 17/318* (2015.01); *H04W 24/08* (2013.01); *H04W 72/048* (2013.01); *H04W 84/12* (2013.01)

(58) Field of Classification Search
CPC .......... H04W 72/0453; H04W 72/048; H04W 24/08; H04W 84/12; H04W 16/14;
(Continued)

(56) References Cited

U.S. PATENT DOCUMENTS

| 9,386,496 B2 | 7/2016 | Gupta et al. |
| 9,439,197 B1 | 9/2016 | Ngo et al. |
| 10,973,028 B2* | 4/2021 | Husted .............. H04W 72/0453 |
| 2013/0169481 A1 | 7/2013 | Takatsuka et al. |

(Continued)

FOREIGN PATENT DOCUMENTS

| CN | 106954237 | 7/2017 |
| WO | 2017/166609 | 10/2017 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Std 802.11-2016 (Revision of IEEE Std 802" IEEE Standard, IEEE, Piscataway, NJ' USA, Dec. 14, 2016 (Dec. 14, 2016), pp. 1-3534, XP068113034, [retrieved on Dec. 19, 2016] Sections 6.3. 37, 9.4.2.5.3, 9.6.8.7 and whole section 11.10.

*Primary Examiner* — Hoon J Chung
(74) *Attorney, Agent, or Firm* — McDonnell Boehnen Hulbert & Berghoff LLP

(57) ABSTRACT

An access system for a wireless local area network is provided. The access system initiates operation in a first frequency band of a plurality of frequency bands of the wireless local area network to provide one or more wireless client devices of the wireless local area network with access to a wireless wide area network. The access system also processes one or more association requests received in the first frequency band to identify one or more associated wireless client device. The access system also determines whether each of the one or more associated wireless client devices supports a second frequency band. The access system also sends a request to the one or more associated wireless client devices to transition from the first frequency band to the second frequency band based on determining (Continued)

that each of the one or more associated wireless client devices supports the second frequency band.

19 Claims, 5 Drawing Sheets

Related U.S. Application Data

(60) Provisional application No. 62/675,651, filed on May 23, 2018.

(51) Int. Cl.
  *H04B 17/318* (2015.01)
  *H04W 24/08* (2009.01)
  *H04W 84/12* (2009.01)

(58) Field of Classification Search
  CPC ..... H04W 88/06; H04W 88/10; H04W 36/14; H04B 17/318
  See application file for complete search history.

(56) References Cited

U.S. PATENT DOCUMENTS

| | | |
|---|---|---|
| 2015/0065157 A1 | 3/2015 | Homchaudhuri et al. |
| 2015/0071271 A1* | 3/2015 | Smedman ................ H04L 9/14 370/338 |
| 2016/0029248 A1 | 1/2016 | Syed et al. |
| 2016/0219589 A1 | 7/2016 | Khawer et al. |
| 2017/0041935 A1 | 2/2017 | Shanmugam et al. |
| 2018/0063742 A1* | 3/2018 | Jia ......................... H04W 4/023 |
| 2018/0124695 A1 | 5/2018 | Gupta et al. |
| 2018/0352493 A1 | 12/2018 | Strater et al. |
| 2019/0239225 A1 | 8/2019 | Siraj et al. |

* cited by examiner

INTELLIGENT BAND SELECTION FOR WIRELESS ACCESS POINT

CROSS-REFERENCE TO RELATED APPLICATION

The present application is a continuation of U.S. patent application Ser. No. 16/411,933, filed on May 14, 2019, and entitled "Intelligent Band Selection for Wireless Access Point," which claims priority to U.S. Provisional Patent Application No. 62/675,651, filed on May 23, 2018, and entitled "Intelligent Band Selection for Wireless Access Point," the entire contents of each of which are herein incorporated by reference as if fully set forth in this description.

BACKGROUND

The present disclosure generally relates to wireless communication systems, and in particular, to intelligent band selection for wireless access points.

Wireless local area networks have greatly improved the ways in which users access information on the Internet. Accessing a wireless local area network may require a user to select a wireless access point within the wireless local area network. A wireless device may choose to act as an access point instead of a client, such as when it acts as a mobile hotspot to serve client devices. When doing so, the wireless device may select a frequency band to provide the client devices access to the wireless local area network.

SUMMARY

The present disclosure provides methods that account for the characteristics and capabilities of wireless client devices when optimizing frequency band and channel selection. This allows a wireless device to choose a faster (e.g., 5 Gigahertz (GHz)) frequency band more often, thus providing a faster connection, while falling back to a slower (e.g., 2.4 GHz) frequency band for legacy wireless client devices or limitations in range as needed.

In one or more implementations of the subject technology, an access system for a wireless local area network is provided. The access system includes one or more processors, and a machine-readable medium comprising instructions stored therein, which when executed by the one or more processors, cause the one or more processors to perform operations. The operations include initiating operation in a first frequency band of a plurality of frequency bands of the wireless local area network to provide one or more wireless client devices of the wireless local area network with access to a wireless wide area network. The operations further include processing one or more association requests received in the first frequency band to identify one or more associated wireless client devices of the one or more wireless client devices. The operations also include determining whether each of the one or more associated wireless client devices supports a second frequency band of the plurality of frequency bands, the second frequency band having a different frequency than the first frequency band. The operations additionally include sending a request to the one or more associated wireless client devices to transition from the first frequency band to the second frequency band based on determining that each of the one or more associated wireless client devices supports the second frequency band.

In one or more implementations of the subject technology, a non-transitory computer-readable medium storing instructions therein that, when executed by one or more processors, cause the one or more processors to perform operations is provided. The operations include initiating operation in a first frequency band of a plurality of frequency bands of a wireless local area network to provide one or more wireless client devices of the wireless local area network with access to a wireless wide area network. The operations further include processing one or more association requests received in the first frequency band to identify one or more associated wireless client devices of the one or more wireless client devices. The operations additionally include determining whether each of the one or more associated wireless client devices supports a second frequency band of the plurality of frequency bands, the second frequency band having a different frequency than the first frequency band. The operations also include sending a request to the one or more associated wireless client devices to transition from the first frequency band to the second frequency band based on determining that each of the one or more associated wireless client devices supports the second frequency band.

In one or more implementations of the subject technology, a computer-implemented method is provided. The method includes initiating operation in a first frequency band of a plurality of frequency bands of a wireless local area network to provide one or more wireless client devices of the wireless local area network with access to a wireless wide area network. The method further includes processing one or more association requests received in the first frequency band to identify one or more associated wireless client devices of the one or more wireless client devices. The method additionally includes determining whether each of the one or more associated wireless client devices supports a second frequency band of the plurality of frequency bands, the second frequency band having a different frequency than the first frequency band. The method also includes sending a request to the one or more associated wireless client devices to transition from the first frequency band to the second frequency band based on determining that each of the one or more associated wireless client devices supports the second frequency band.

In one or more implementations of the subject technology, a system is provided that includes means for initiating operation in a first frequency band of a plurality of frequency bands of a wireless local area network to provide one or more wireless client devices of the wireless local area network with access to a wireless wide area network. The system further includes means for processing one or more association requests received in the first frequency band to identify one or more associated wireless client devices of the one or more wireless client devices. The system additionally includes means for determining whether each of the one or more associated wireless client devices supports a second frequency band of the plurality of frequency bands, the second frequency band having a different frequency than the first frequency band. The system also includes means for sending a request to the one or more associated wireless client devices to transition from the first frequency band to the second frequency band based on determining that each of the one or more associated wireless client devices supports the second frequency band.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
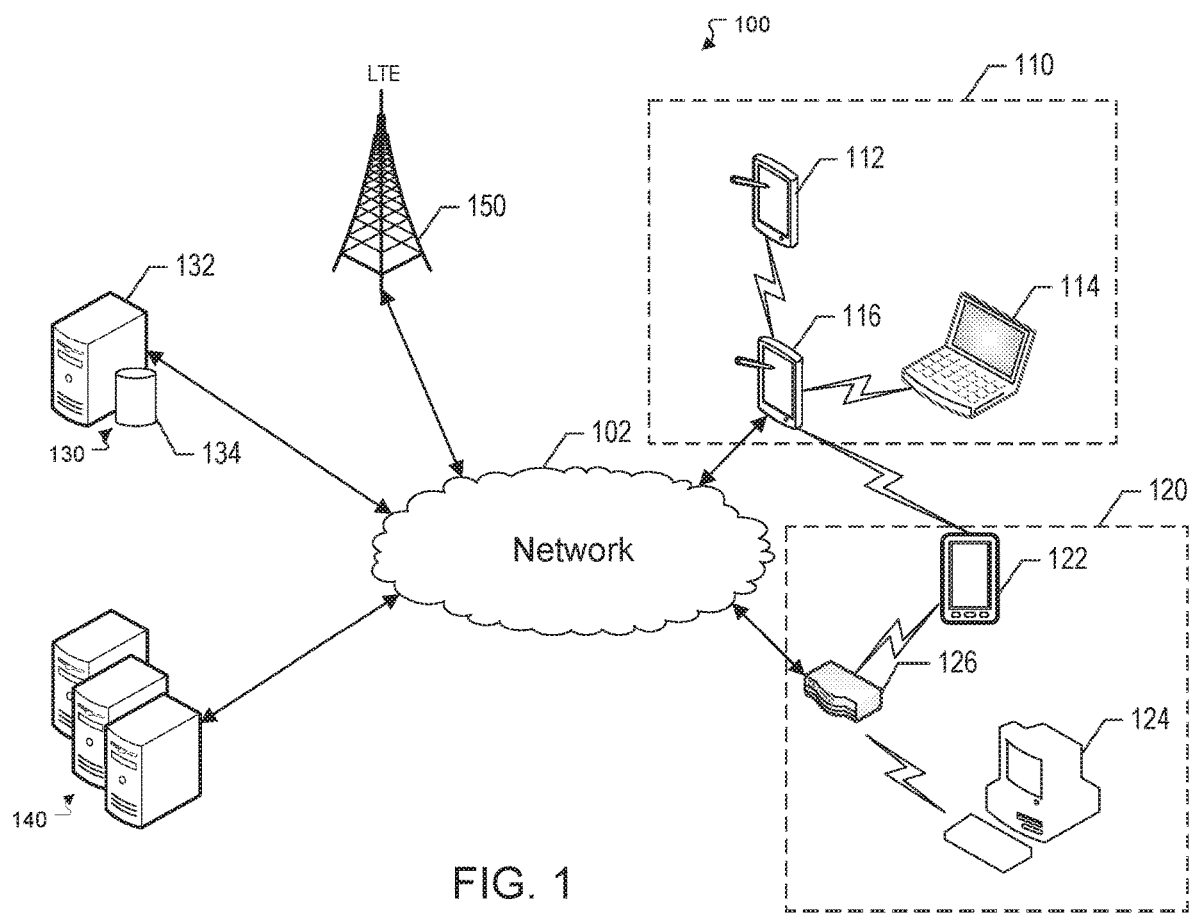
FIG. 1 illustrates an example network environment which provides for wireless network access.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

A wireless communication system, such as WiFi, may operate on a 2.4 GHz frequency band or a 5 GHz frequency band. The 2.4 GHz frequency band is an original frequency band defined by the WiFi standards, and nearly all WiFi client devices are designed to support this frequency band. This frequency band, however, has only three commonly used 20-MHz channels for WiFi, and may be crowded with many WiFi client devices in addition to Bluetooth client devices, Microwave-based devices (e.g., microwaves), and other wireless-based devices, so performance may be poor. The 5 GHz frequency band is an optional frequency band defined by the WiFi standards. Nearly any commercial client device (e.g., smartphone, laptop, etc.) that supports the 5 GHz frequency band can also support the 2.4 GHz frequency band, but not usually at the same time, just one or the other. The 5 GHz frequency band supports approximately 500 MHz of available channels (depending on the geographical region), is much less congested compared to the 2.4 GHz frequency band, and generally provides a better connection to the network. The 5 GHz frequency band may not travel as far as the 2.4 GHz frequency band in indoor environments, given that lower frequencies penetrate walls with less loss. In this respect, the 2.4 GHz frequency band is often used by client devices at far range and the 5 GHz frequency band is commonly used at near range (assuming a dual-band access point (AP) that transmits in both bands at the same time). Commercial APs tend to be either single-band 2.4 GHz for low cost or legacy devices, or dual-band simultaneous devices that support both 2.4 and 5 GHz frequency bands concurrently.

A wireless device may sometimes choose to act as AP instead of a client, such as when it acts as a mobile hotspot to serve other clients by using a cellular communication system (e.g., Long Term Evolution (LTE)) or other means as a backhaul. When doing so, the wireless device may choose to be either a 2.4 GHz or 5 GHz AP. However, the wireless device may not have sufficient hardware to do both at the same time, and the wireless device may consume more power from the battery to support both bands at the same time.

Traditional methods exist to select a band for the wireless device to use as an AP. These methods typically either select a frequency channel at random, or use chronological information from WiFi scans to select channels that have less network congestion. Many of the traditional methods require user intervention when the 5 GHz frequency band is requested. These methods generally do not take the capabilities or characteristics of the client devices into account when a selection is made. This can lead to the selection method often being too conservative in selecting the 2.4 GHz frequency band, when a higher performing, lower power consuming frequency band (e.g., 5 GHz) is available for selection.

Other traditional approaches require users to input the frequency band they would like to use. However, users generally do not know whether all of their devices support the faster 5 GHz frequency band, and users can guess if they have enough signal strength to use the 5 GHz frequency band. Requiring user interaction is cumbersome, which can lead to behavior that is either too conservative with selection of a channel with low throughput at 2.4 GHz or too aggressive with multiple failed attempts to connect to a channel at the 5 GHz frequency band.

The present disclosure provides methods that account for the characteristics and capabilities of the wireless client devices when optimizing the frequency band and channel selection. This allows the wireless client device to choose the faster 5 GHz frequency band more often while falling back to the 2.4 GHz frequency band for legacy wireless client devices or limitations in range as needed. For example, when setting up a temporary wireless access point (e.g., WiFi mobile hotspot) utilizing a single frequency channel, on a low-power wireless device, the wireless access point can identify the frequency bands available for selection and whether wireless client devices that only support a legacy frequency band (e.g., 2.4 GHz) exist. The wireless access point may select a frequency band to ensure optimal performance while still supporting legacy client devices.

FIG. 1 illustrates an example network environment 100, which provides for wireless network access. Network environment 100 includes wireless local area networks 110 and 120, network 102, server 130, server 140, and service tower 150. Wireless local area network 110 includes wireless client devices (WCDs) 112 and 114, and wireless access point 116. Wireless local area network 120 includes wireless client devices 122 and 124, and wireless access point 126.

Wireless client devices 112, 114, 122, or 124 may allow a user to access a wireless local area network, such as wireless local area network 110 or 120, by authenticating credentials of the user with an authentication service, such as provided by wireless access points 116 or 126.

Each of wireless client devices 112, 114, 122, and 124 represents various forms of processing devices. Example processing devices include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Example wireless client devices 112, 114, 122, and 124 are discussed further below with respect to FIG. 2.

Server 130 can include one or more computing devices 132 and one or more computer-readable storage devices 134 (e.g., data stores). Server 130 may be a system or device having a processor, a memory, and communications capability for providing content and/or services to client devices. In some example aspects, server 130 can be a single computing device, for example, a computer server. In other embodiments, server 130 can represent more than one computing device working together to perform the actions of a server computer (e.g., cloud computing). Further, server 130 can represent various forms of servers including, but not limited to an application server, a proxy server, a network server, an authentication server, an electronic messaging server, a content server, etc., accessible to the wireless client devices 112, 114, 122, and 124. In some aspects, server 130 may be an authentication server that provides user authentication services for wireless local area network access.

Each of servers 140 can be a single computing device such as a computer server or can represent more than one computing device working together to perform the actions of a server computer (e.g., cloud computing). Server 130 and servers 140 may be implemented as a single server or across multiple servers. Servers 140 may perform various functionalities and/or storage capabilities described herein either alone or in combination with server 130. Each of servers 140 may host various services. For example, one of servers 140 may host services including cloud-based services.

A cloud-based service may include a service provided by cloud computing resources, such as, but not limited to, server 130, servers 140 and/or other computing resources accessible via one or more networks (e.g., network 102). A cloud-based service may require authentication of a user account for access via a cloud-based application, such as a web-based personal portal or a web-based email application.

A user may interact with content and/or services hosted by server 130, through a client application installed at wireless client device 112, such as a web browser application. Communication between wireless client device 112 and server 130 may be facilitated through wireless local area network 110 and network 102.

Wireless client devices 112, 114, 122, and/or 124 may communicate wirelessly with service tower 150 through a local communication interface (not shown), which may include digital signal processing circuitry where necessary. The communication interface may provide for communications under various modes or protocols, for example, Long Term Evolution (LTE) voice and data, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication with the service tower 150 may occur through a local radio-frequency transceiver (not shown). In addition, short-range communication may occur, for example, using a Bluetooth, WiFi, or other such transceiver. As depicted in FIG. 1, service tower 150 provides LTE cellular service, however, service tower 150 may be associated with other communication modes or protocols without departing from the scope of the present disclosure.

Network 102 can include, for example, any one or more of a campus area network (CAN), a metropolitan area network (MAN), a wide area network (WAN), a broadband network (BBN), the Internet, and the like. Further, network 102 can include, but is not limited to, any one or more of the following network topologies, including a bus network, a star network, a ring network, a mesh network, a star-bus network, tree or hierarchical network, and the like.

Communication between clients (e.g., wireless client devices 112, 114, 122, and/or 124) and servers (e.g., server 130 and/or servers 140) can occur via a virtual private network (VPN), Secure Shell (SSH) tunnel, Transport Layer Security (TLS) tunnel, Extensible Authentication Protocol (EAP)-TLS based tunnel, tunnel on top of GAS/ANQP, or other secure network connection. Network 102 may include one or more network devices that facilitate communications between wireless client devices 112, 114, 122, and/or 124 and server 130 and/or servers 140, such as switch devices, router devices, relay devices, etc., and/or may include one or more servers.

Each of wireless local area networks 110 and 120 is illustrated as including multiple wireless client devices 112, 114, 122, or 124. However, each of wireless local area network 110 and 120 may include only one of wireless client devices 112, 114, 122, or 124.

Network environment 100 is illustrated as including multiple wireless local area networks 110 and 120. However, network environment 100 may include only one of wireless local area networks 110 and 120. In some implementations, wireless local area networks 110 and/or 120 may be, or may include, one or more of a bus network, a star network, a ring network, a relay network, a mesh network, a star-bus network, a tree or hierarchical network, and the like.

Wireless access point 110 and/or 126 is a network device and can include other network devices, such as a hub, a router, a switch, and/or a bridge. The network device may be a combination of network devices, such as a wireless router that includes a router, a switch, and a wireless access point. The network device can be a wireless router with a built in modem (e.g., cable modem) for example. Other network devices can also be utilized in implementations of the subject technology.

Wireless local area networks 110 and 120 can include, but are not limited to, a computer network that covers a limited geographic area (e.g., a home, school, computer laboratory, or office building) using a wireless distribution method (e.g., spread-spectrum or OFDM). Wireless devices 112 and 114 may associate with wireless access point 116 to access wireless local area network 110 using WiFi standards (e.g., IEEE 802.11), Some WiFi access points are mobile hot spots that provide, e.g., a WiFi-to-cellular bridge. This type of access point may be carried around by individuals or used in automobiles to provide mobile WiFi service. For example, wireless device 116 acts as a wireless access point (e.g., mobile hotspot), where wireless client devices 112, 114 and/or 122 may associate with wireless device 116 to access network 102 (e.g., LTE) using the WiFi standards.

WiFi, as defined by the IEEE in the 802.11 family of standards, may include multiple frequency bands each consisting of one or more logical channels associated with particular carrier frequencies. As an example, WiFi wireless access points (e.g., 116, 126) may use the 2.4 GHz band for communication with WCDs (e.g., 112, 114, 122, 124). In North America, this band includes 11 distinct channels, associated pairwise with 11 central carrier frequencies.

In order to determine nearby WiFi client devices, a wireless access point (e.g., 116) may scan these frequencies in any order. Assuming that the wireless access point 116 scans the frequencies in ascending order, the wireless access point 116 may first tune to a first frequency (e.g., 2.412 GHz), and listen on this frequency for some period of time to determine whether there are one or more client devices transmitting on the frequency. Alternatively or additionally, the wireless access point 116 may transmit one or more probe requests on the frequency, in an attempt to elicit a response from the client devices. For each client device the wireless access point 116 detects, the wireless access point 116 may attempt to obtain an associated identifier, such as a service set identifier (SSID), basic service set identifier (BSSID), and/or media access control (MAC) address. Other identifiers, such as serial numbers or Internet Protocol (IP) addresses may be used instead of or as well as these identifiers. The wireless access point 116 may continue by scanning the next frequencies in ascending order, and repeating this process for each frequency scanned.

For each client device identified during such a scan, the wireless access point 116 may also measure the strength at which it receives signals from the client device. These measurements may, for example, be of a received signal strength indicator (RSSI), representing RF power measured over the preamble of a received WiFi frame. The measurements may also be of a received channel power indicator (RCPI), representing RF power measured over the preamble and the rest of the received frame. The RCPI measurements may indicate the transmit power of the wireless access point 116 in some implementations, or may indicate the transmit power of the wireless client devices in other implementations. Both RSSI and RCPI may be represented using various scales and techniques. For instance, some WiFi devices may estimate RSSI received power level in dBm, but not all are calibrated similarly (e.g., so that 0 dBm is 1 mW). Other WiFi devices may estimate RSSI on a scale of 0 to n, where higher values represent stronger received signals.

After scanning some or all of the 11 carrier frequencies, the wireless access point 116 may have collected information related to a group of client devices transmitting thereon. In some cases, the scan can result in no client devices being discovered. However, in many practical situations, one or more client devices may be discovered.

In addition to the 2.4 GHz frequency band, the wireless access point 116 may also scan other frequency bands. For instance, in North America the 5 GHz WiFi frequency band consists of a number of channels formed using carrier frequencies in the 5.180 to 5.825 GHz range. Other frequency bands may exist. Consequently, the wireless access point 116 may scan the 11 frequencies of the 2.4 GHz frequency band and one or more frequencies in the 5 GHz frequency band, for instance. As a result of this scanning, the wireless access point 116 may identify a group of nearby client devices that use the channels of one or more of these frequency bands.

The wireless access point 116 may thus identify a subset of frequencies which includes the frequencies used by the client devices that were identified in the most recent scan of the full set of frequencies, and that are associated with a received signal strength that is equal to and greater than a predetermined received signal strength threshold. The predetermined received signal strength threshold may be set to a fixed value by the wireless access point 116. In some implementations, the predetermined received signal strength threshold value may be explicitly chosen through a user input, or may be derived based on the relative RSSI values present in the various signals from one or more client devices.

In some implementations, the wireless device 116 may act as a client device, where the wireless device 116 may connect with wireless client devices 112, 114 or 122 with requiring a wireless access point according to a WiFi standard (e.g., WiFi Direct). In this respect, the principles of the subject technology can be employed to find the correct frequency channel for a peer-to-peer system.

Figure 2:
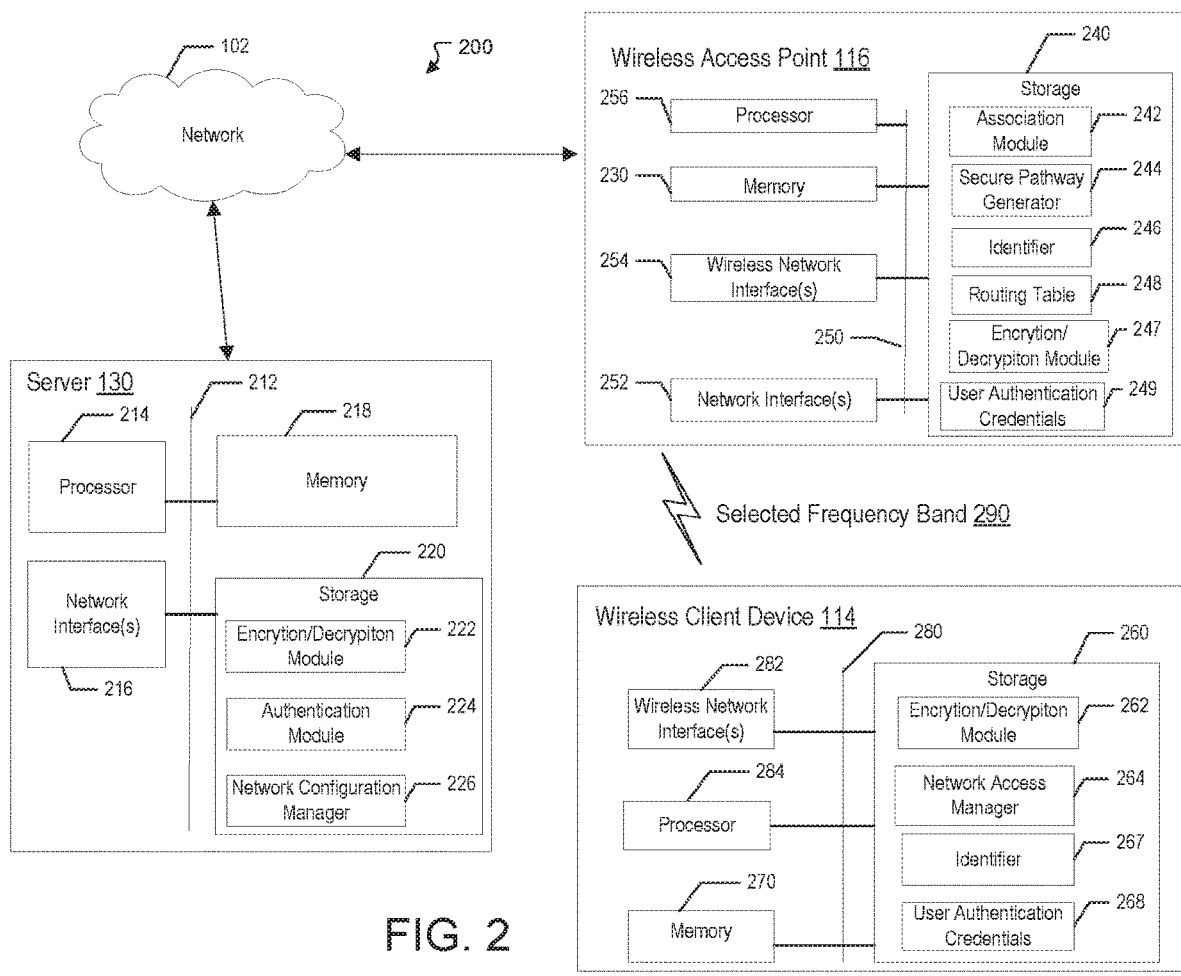
FIG. 2 is a block diagram illustrating an example wireless client device and wireless access point from the network environment of FIG. 1 according to certain aspects of the disclosure.

FIG. 2 is a block diagram illustrating an example network environment 200. Network environment 200 includes an example wireless client device 114, server 130 and wireless access point 116 from the network environment 100 of FIG. 1 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

Wireless client device 114 includes memory 270, processor 284, storage 260, bus 280 and one or more wireless network interfaces 282. Wireless client device 114 may establish a network connection with wireless access point 116 via one or more wireless network interfaces 282.

Memory 270 may include a dynamic random-access memory (DRAM) and/or a read-only memory (ROM). Memory 270 may store data and instructions that may be retrieved by processor 284. Storage 260 may include a non-volatile read-and-write memory that stores data and instructions, even when wireless client device 114 is off, that may be retrieved by the processor 284. Storage 260 may include encryption/decryption module 262, network access manager 264, identifier 267, and user authentication credentials 268. Storage 206 may include magnetic, solid state or optical media.

From memory 270 and/or storage 260, processor 284 may retrieve instructions to execute and data to process in order to perform the processes of the subject disclosure. Processor 284 can be a single processor, a multi-core processor or multiple processors. Each of encryption/decryption module 262 and network access manager 264 may include instructions that, when executed by processor 284, cause processor 284 to perform operations described below.

Network access manager 264 may include instructions to manage wireless connections between wireless client device 114 and a wireless local area network. Network access manager 264 may include instructions to discover and determine the capabilities of wireless access points, send an authentication request for wireless local area network access, identify and select a wireless local area network to access, and associate with a wireless access point to access the wireless local area network.

Network access manager 264 may include instructions to identify and/or select one or more wireless local area networks that the user is authorized to access. In example aspects, network access manager 264 may include instructions to receive a list of one or more wireless local area networks that the user is authorized to access from server 130. Network access manager 264 may include instructions to select a wireless local area network within the list to associate with based on the order of the list. Network access manager 264 may include instructions to associate wireless client device 114 with a wireless access point to access a wireless local area network that the user is authorized to access.

Network access manager 264 may include instructions to communicate with a wireless access point using ANQP, which is supported by WiFi standards (e.g., IEEE 802.11, Hotspot 2.0). Network access manager 264 may include instructions to determine if wireless access point 116 supports authentication via a cloud-based server. Network access manager 264 may include instructions to generate an authentication request, including, for example, user authentication credentials 268.

Encryption/decryption module 262 may include instructions to perform encryption and/or decryption of transmissions to/from server 130. Encryption/decryption module 262 may include instructions to encrypt the authentication request, for example, using one or more cryptographic keys stored in the memory 270. Wireless client device 114 may provide the encrypted authentication request to wireless access point 116 via network 102.

Identifier 267 may be an identifier that is associated with wireless client device 114, such as a MAC address. User authentication credentials 268 may include credentials for a user account of a cloud-based service that is associated with a user of wireless client device 114. User authentication credentials 249 may include credentials for a user account of a cloud-based service that is associated with a user of wireless device 116. In some aspects, credentials for a user account of a cloud-based service may include a user account name, a user account password, a realm, an email address and/or any item corresponding to the user account of the cloud-based service. Credentials for a user account of a cloud-based service may be used for user account authentication, such as at server 130. Upon user account authentication, server 130 may identify personal information about the user, such as information about user social network, contacts, user preferences, historical activity, and profile information.

In situations in which the system and processes discussed herein collect or make use of personal information about users, the users may be provided with an opportunity to control whether and/or to what extent the programs or features collect and make use of such user information, or to control whether and/or how to receive content that may be more relevant to the user. In addition, where personal information about the user is stored and/or shared with one or more other users, various privacy controls may be employed to facilitate protecting the storing and/or sharing of such content, such as the user may be provided with an opportunity to limit the visibility of the personal information to one or more other users.

Wireless access point 116 includes memory 230, processor 256, storage 240, bus 250, one or more wireless network interfaces 254 and one or more network interfaces 252. Wireless access point 116 may establish a network connection with network 102 via one or more network interfaces 252. Wireless access point 116 may establish a network connection with wireless client device 114 via one or more wireless network interfaces 254. The one or more wireless network interfaces 254 may enable operation of wireless access point 116 within a selected frequency band 290. In some implementations, each of the one or more wireless network interfaces 254 is configured to operate in a dedicated frequency band (e.g., 2.4 GHz or 5 GHz). In other implementations, at least one of the wireless network interfaces 254 supports more than one frequency band (e.g., dual-band) such that the wireless network interface 254 is configured to switch between the supported frequency bands (e.g., 2.4 GHz and 5 GHz). In one example, the wireless network interface 254 is configured to initiate operation in the 2.4 GHz frequency band and switch upward to the 5 GHz frequency band. In another example, the wireless network interface 254 is configured to initiate operation in the 5 GHz frequency band and switch downward to the 2.4 GHz frequency band.

Memory 230 may include a dynamic random-access memory (DRAM) and/or a read-only memory (ROM). Memory 230 may store data and instructions that may be retrieved by processor 256. Storage 240 may include a non-volatile read-and-write memory that stores data and instructions, even when wireless access point 116 is off, that may be retrieved by the processor 256. Storage 240 may include association module 242, secure pathway generator 244, identifier 246, encryption/decryption module 247, routing table 248, and user authentication credentials 249. For example, storage 240 may include magnetic, solid state or optical media.

From memory 230 and/or storage 240, processor 256 may retrieve instructions to execute and data to process in order to perform the processes of the subject disclosure. Processor 256 can be a single processor, a multi-core processor or multiple processors. Each of association module 242 and secure pathway generator 244 may include instructions that, when executed by processor 256, cause processor 256 to perform operations described below.

Association module 242 may include instructions to manage wireless connections between wireless access point 116 and wireless client devices. Association module 242 may include instructions to broadcast capabilities of authentication and association, respond to queries and authentication requests from wireless client devices, associate with wireless client devices based on user account credentials, and grant wireless local area network access.

In some implementations, association module 242 may include instructions to manage wireless connections between wireless access point 116 and a wireless client device. Association module 242 may include instructions to discover and determine the capabilities of wireless client devices, identify and select a frequency band, and associate with a wireless client device for the wireless client device to access the wireless local area network.

In some implementations, association module 242 determines the capabilities of a wireless client device by determining whether the wireless client device is operating indoors or outdoors and by determining whether the wireless client device is located near range or far range relative to a wireless access point (e.g., wireless access point 116). In other implementations, association module 242 determines the capabilities of a wireless client device by identifying whether the wireless client device is a legacy device. In some examples, if any wireless client device is at far range and indoors, then a first frequency band (e.g. the 2.4 GHz frequency band) may be preferred. In other examples, if any wireless client device is a legacy device and only supports the first, e.g. 2.4 GHz, frequency band and not a second, e.g. 5 GHz, frequency band, then running the wireless access point 116 at the first, e.g. 2.4 GHz, frequency band is preferred. In still other examples, if all wireless client devices support the second, e.g. 5 GHz, frequency band and are not at far range (e.g., usually for mobile hotspots, the wireless client devices are nearby), then the second, e.g. 5 GHz, frequency band is preferred due to higher performance and less network congestion.

In some implementations, the wireless access point 116 may be configured to operate initially at the first, e.g. 2.4 GHz, frequency band. In this respect, a process of intelligent band section may begin by configuring the wireless access point 116 to operate in the first frequency band, and over a given time period, the association module 242 associates one or more wireless client devices through respective association frame exchanges. In some implementations, association module 242 selects a frequency channel in the first, e.g. 2.4 GHz, frequency band (e.g., 2.41 GHz), which has low network congestion, based on recent scans of WiFi traffic across the different channels of the first frequency band.

In some implementations, the wireless access point 116, using association module 242, checks the stated capability fields of all the associated wireless client devices to determine whether the wireless client devices identify support for the second, e.g. 5 GHz frequency band. This may be performed after a predetermined amount of elapsed time since the wireless access point 116 initiated operation (e.g., about 30 seconds). In this example, the elapsed time requirement ensures that all wireless client devices that request to associate with the wireless access point 116 have had time to locate the wireless access point 116 and do so. In further examples, the wireless access point 116 may determine whether wireless client devices support the second, e.g. 5 GHz, frequency band by referencing stored information about devices which previously associated to the wireless access point 116. In other implementations, the wireless access point 116 may obtain signal measurements with frequency band switching by trial and error to determine the capabilities if the wireless client devices choose to not send the capability information to the wireless access point 116. In some implementations, the wireless access point 116, using association module 242, collects received RSSI measurements from the wireless client devices to determine whether any of the wireless client devices are transmitting from a far distance relative to the wireless access point 116 or have weak signal strength. The received RSSI measurements may be based on signals received from the wireless client devices in some implementations, or may be based on the wireless client devices reporting the RSSI of signals it sees from the wireless access point 116 in other implementations.

In some implementations, association module 242 reads the received RSSI measurements and determines whether the received RSSI measurements exceed a predetermined received signal strength threshold. If the RSSI measurement is considered strong enough (i.e., the RSSI measurement exceeds the predetermined received signal strength threshold) and all of the wireless client devices are capable of supporting the second, e.g. 5 GHz, frequency band, then association module 242 may request the identified wireless client devices to roam to the second, e.g. 5 GHz, frequency band. The frequency transition may be performed by the wireless client devices when there is a lull in the data transmission. In some implementations, association module 242 selects a frequency channel in the second, e.g. 5 GHz, frequency band (e.g., 5.1 GHz), which has low network congestion, based on recent scans of WiFi traffic across the different channels of the second frequency band.

In some implementations, the request to wireless client devices to transition frequencies may be performed using existing mechanisms in WiFi to facilitate the frequency transition by the wireless client devices, including the channel switch announcement (CSA). In some implementations, if the wireless device (e.g., 116) is a 2×2 (e.g., 2-antenna) AP and can support dual bands simultaneously in a 1×1+1×1 mode, then the frequency transition may be acceptable to wireless device 116 for a short time until all the wireless client devices have transitioned to a channel in the 5 GHz frequency band.

In some implementations, during lulls in data, wireless access point 116 can transition back operations to the first, e.g. 2.4 GHz, frequency band and transmit, using association module 242, beacons to the wireless client devices to determine whether there are other wireless client devices that only support the first frequency band, which may have recently arrived within range of wireless access point 116. If wireless access point 116, using association module 242, detects these type of wireless client devices that only support the first frequency band due to capability or far range, wireless access point 116, using association module 242, reverts back to the second, e.g. 5 GHz, frequency band (at the operating frequency of the associated wireless client devices) and employs CSA to cause the associated wireless client devices to revert back to the first frequency band.

In some implementations, the wireless access point 116 transitions from the first frequency band to the second frequency band even though the wireless access point 116 has not determined if all of the wireless client devices support the second frequency band. The wireless access point 116 may send an announcement frame to the wireless client devices that includes a request to each of the wireless client devices to transition from the first frequency band to the second frequency band. The wireless access point 116 may then determine whether each of the wireless client devices transitioned from the first frequency band to the second frequency band successfully in response to the announcement frame. This is because not all of the wireless client devices properly advertise their ability to support other frequency bands.

In some implementations, the wireless access point 116 is simultaneously set up on both frequency bands (e.g., 2.4 GHz, 5 GHz). In this respect, the wireless access point 116 can listen if any wireless client devices connect to a channel in the first frequency band (e.g., 2.4 GHz). If all of the wireless client devices connect to a channel in the second frequency band (e.g., 5 GHz), then the wireless access point 116 terminates simultaneously operating on the first and second frequency bands and proceeds to operate in only one of the frequency bands (e.g., 5 GHz). In this case, simultaneous operation across multiple frequency bands is inefficient in terms of power consumption and channel throughput. However, the simultaneous operation on both frequency bands, for example, enables the wireless access point 116 to determine what wireless client devices are on the network more effectively.

In some implementations, wireless access point 116 sends a message indicating availability of a wireless local area network. Wireless access point 116 may send an advertisement indicating availability of a wireless local area network. The advertisement may include a beacon message. The advertisement, e.g. a message beacon, may be sent prior to wireless client device 114 sending a join request. In some aspects, wireless client device 114 may receive an information request, from wireless access point 116 prior to wireless client device 114 sending the join request.

In some implementations, wireless client device 114 may send a beacon indicating capabilities for frequency bands, supporting WiFi standards including IEEE 802.11. In some aspects, wireless access point 116 may query wireless client device 114 when wireless client device 114 is in an unauthenticated and unassociated state with wireless access point 116. The query may include a list of elements that wireless access point 116 requests to receive from wireless client device 114, including, for example, capabilities for supporting certain frequency bands. Wireless client device 114 may provide a response to wireless access point 116. The response may include the list of elements, including, for example, capabilities for supporting certain frequency bands. The list of elements may include pre-determined elements, which are supported by WiFi standards (e.g., IEEE 802.11, Hotspot 2.0).

Association module 242 may include instructions to send an advertisement, such as a beacon, about the capabilities of wireless access point 116. Association module 242 may include instructions to respond to queries from wireless client device 114 and indicate the capabilities of wireless access point 116. In example aspects, association module 242 may include instructions to detect an authentication request from wireless client device 114 and forward the authentication request to server 130.

Association module 242 may include instructions to grant access to wireless local area network 110 in response to an association request, such as from wireless client device 114. Association module 242 may include instructions to associate with wireless client device 114 to access wireless local area network 110 based on authentication of user account credentials. In example aspects, association module 242 may include instructions to send a notification of the association of wireless client device 114 to server 130. In some implementations, the association request includes a capability field associated with a wireless client device (e.g., 114) that sent the association request. In some aspects, the association module 242 receives an association request from each wireless client device within a range of the wireless access point 116. The wireless access point 116 may process each association request. The wireless access point 116 may then, after a given amount of time, assess the capabilities of each of the wireless client devices that successfully associated with the wireless access point 116. These capabilities may be determined from the capability field, or known from history if that device had a prior association with the wireless access point 116. In some aspects, the wireless access point 116 may determine the capabilities of a wireless client device by trial and error with band switching.

Secure pathway generator 244 may include instructions to generate a secure pathway within wireless access point 116, such as a secure connection between wireless client device 114 and server 130. In some aspects, secure pathway generator 244 may include instructions to encapsulate transmissions between wireless client device 114 and server 130 in a tunnel, such as a TLS tunnel, EAP-TLS based tunnel, tunnel on top of GAS/ANQP. For example, secure pathway generator 244 may include instructions to transport user authentication credentials 268 to server 130 via the tunnel.

Encryption/decryption module 247 may include instructions to perform encryption and/or decryption of transmissions to/from server 130. Encryption/decryption module 247 may include instructions to encrypt the authentication request, for example, using one or more cryptographic keys stored in the memory 240. Wireless device 116 may provide the encrypted authentication request to server 130, e.g., via network 102.

In example aspects, wireless access point 116 may receive a security token, such as a nonce, from server 130 and may transmit the security token to wireless client device 114 via the secure pathway. Wireless client device 114 may then provide the security token back to the server 130, via the secure pathway. In some aspects, secure pathway generator 244 may include instructions to forward one or more encryption keys from server 130 to wireless client device 114 and may forward encrypted content from server 130 to wireless client device 114. In some aspects, secure pathway generator 244 may include instructions to forward the encrypted content and/or encryption keys.

Identifier 246 may be an identifier that is associated with the wireless access point 116, such as a network identifier including a BSSID (e.g., MAC address), and/or a SSID. The owner of the wireless access point 116 may register identifier 246 with a service, for example, an authentication service hosted by server 130.

Routing table 248 may include route information about directly connected and remote networks associated with wireless access point 116. Routing table 248 may list the routes to particular network destinations, and in some cases, metrics (e.g., distances) associated with those routes. Wireless access point 116 may search the routing information stored in routing table 248 to forward a data packet toward its destination network, for example, based on a destination IP address of the data packet.

Server 130 may include memory 218, processor 214, storage 220, bus 212 and one or more network interfaces 216. Server 130 may establish a network connection with network 102 via one or more network interfaces 216.

Memory 218 may include a dynamic random-access memory (DRAM) and/or a read-only memory (ROM). Memory 218 may store data and instructions that may be retrieved by processor 214. Storage 220 may include a non-volatile read-and-write memory that stores data and instructions, even when server 130 is off, that may be retrieved by processor 214. Storage 220 may include encryption/decryption module 222, authentication module 224 and network configuration manager 226. For example, storage 220 may include a magnetic, solid state or optical media.

From memory 218 and/or storage 220, processor 214 may retrieve instructions to execute and data to process in order to perform the processes of the subject disclosure. Processor 214 can be a single processor, a multi-core processor or multiple processors. Each of encryption/decryption module 222, authentication module 224 and network configuration manager 226 may include instructions that, when executed by processor 214, cause processor 214 to perform operations described below.

Encryption/decryption module 222 may include instructions to assign one or more cryptographic keys to wireless client device 114. In some aspects, encryption/decryption module 222 may include instructions to generate a random number and may encrypt/sign the random number using a cryptographic key assigned to wireless client device 114. Authentication module 224 may include instructions to authenticate the user, for example, by verifying user authentication credentials 268 at a cloud-based service.

Network configuration manager 226 may include instructions to provide a user interface that allows network owners to login and share wireless local area network access with other users by associating identifiers of the user with network identifiers of their networks. The user interface may be a graphical user interface with elements representing different users and networks.

Figure 3:
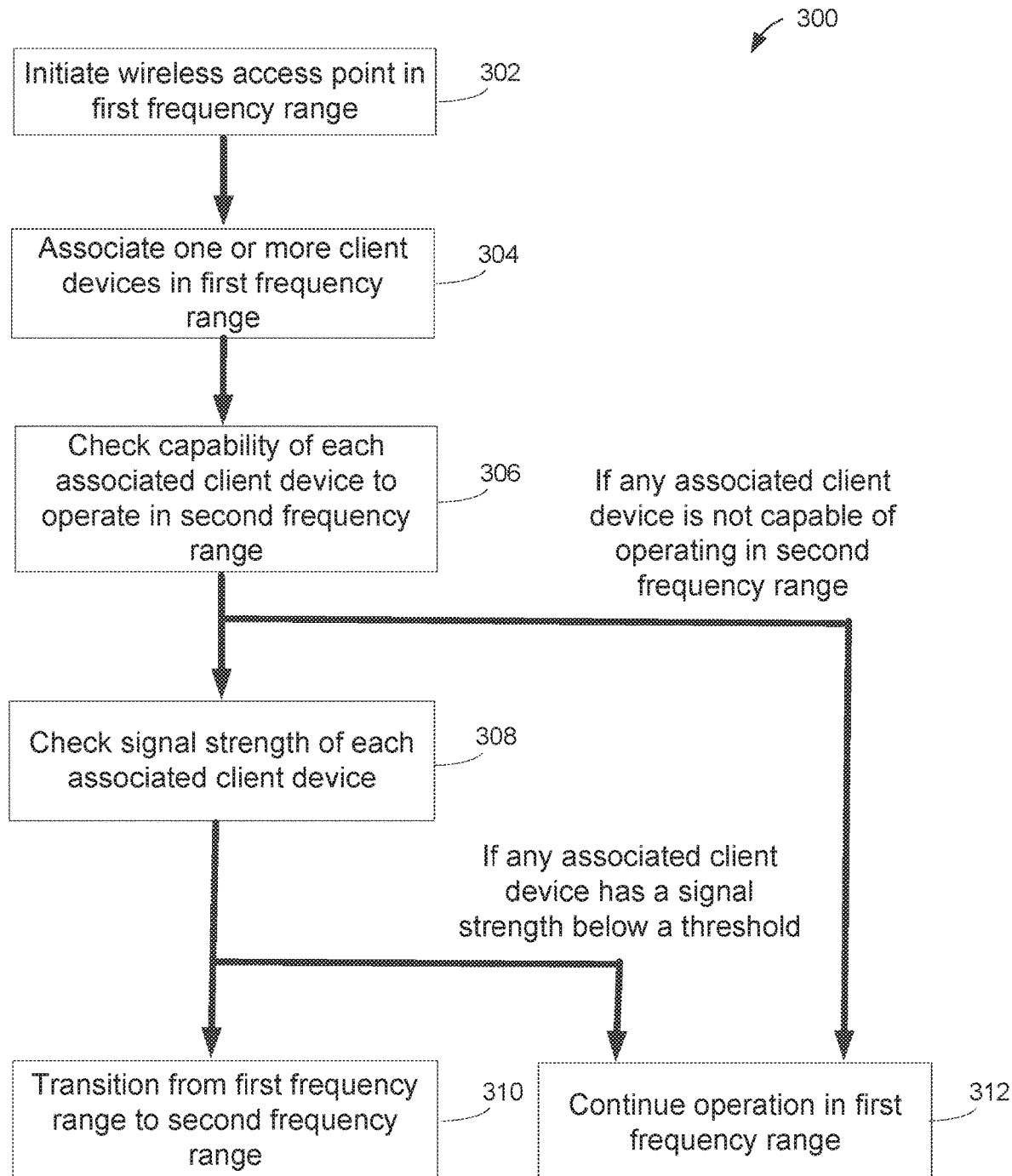
FIG. 3 illustrates a flow chart according to example aspects of the present disclosure.

FIG. 3 is a flowchart of operations 300 that may be carried out in accordance with example implementations. Operations 300 shown in FIG. 3 could be executed by one or more computing devices, such as wireless access point 116 or wireless access point 126 or a different type of computing device operating as an access system for a wireless local area network. In some examples, operations 300 may be executed by a mobile hotspot device. Operations 300 may include one or more actions as illustrated by blocks 302-312. Although the blocks are illustrated in sequential order, these blocks may in some examples be performed in parallel, and/or in a different order than those described herein. Also, the various blocks may be combined into fewer blocks, divided into additional blocks, and/or removed based upon the directed implementation.

In addition, the operations 300 show functionality of some example implementations. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device. In addition, one or more blocks in FIG. 3 may represent circuitry that is wired to perform the specific logical operations.

Block 302 includes initiating a wireless access point in a first frequency range. For instance, a mobile access point may be initiated to operate in a 2.4 GHz frequency band to provide network access to client devices. A channel may initially be chosen in the 2.4 GHz frequency band which has low congestion based on recent scans of WiFi traffic across a range of channels.

Block 304 includes associating one or more client devices in the first frequency range. An associated client device may connect to a channel within the first frequency range to associate with the wireless access point. The first frequency range may be maintained for a predetermined amount of time (e.g., 30 seconds) to allow any client devices sufficient opportunity to request to connect to the wireless access point.

Block 306 includes checking the capability of each associated client device to operate in a second frequency range. The second frequency range may be the 5 GHz frequency band. The capability of each associated client device may be checked after a predetermined amount of time has elapsed following initiation of the wireless access point. Checking the capability of each associated client device to operate in the second frequency range may involve checking a capability field stated by each associated client device to check if each associated client device states 5 GHz support. If any associated client device is not capable of operating in the second frequency range, block 312 may be performed to continue operation in the first frequency range.

Block 308 includes checking the signal strength of each associated client device. In some examples, signal strength may be collected as RSSI or RCPI measurements. The signal strength may be compared to a predetermined received signal strength threshold. By comparing the signal strength of each associated client device to a threshold, client devices at a far distance or otherwise having a weak signal strength may be identified. If any associated client device has a signal strength below the threshold, block 312 may be performed to continue operation in the first frequency range.

In some examples, block 308 may be performed after block 306 has been performed and each associated client device has been determined to be capable of operating in the second frequency range. In other examples, block 306 and block 308 may be performed in parallel or block 308 may be performed before block 306.

Block 310 includes transitioning operation from the first frequency range to the second frequency range. If, for example, each associated client device is 5 GHz capable and has a strong enough RSSI, each associated client device may be requested to roam to 5 GHz. This request may be sent by the wireless access point when there is a lull in data transmission. A channel may be chosen by the wireless access point in the 5 GHz band which has low congestion based on recent scans of WiFi traffic across all channels. The CSA mechanism may be used to cause each associated client device to switch to the second frequency range.

Figure 4:
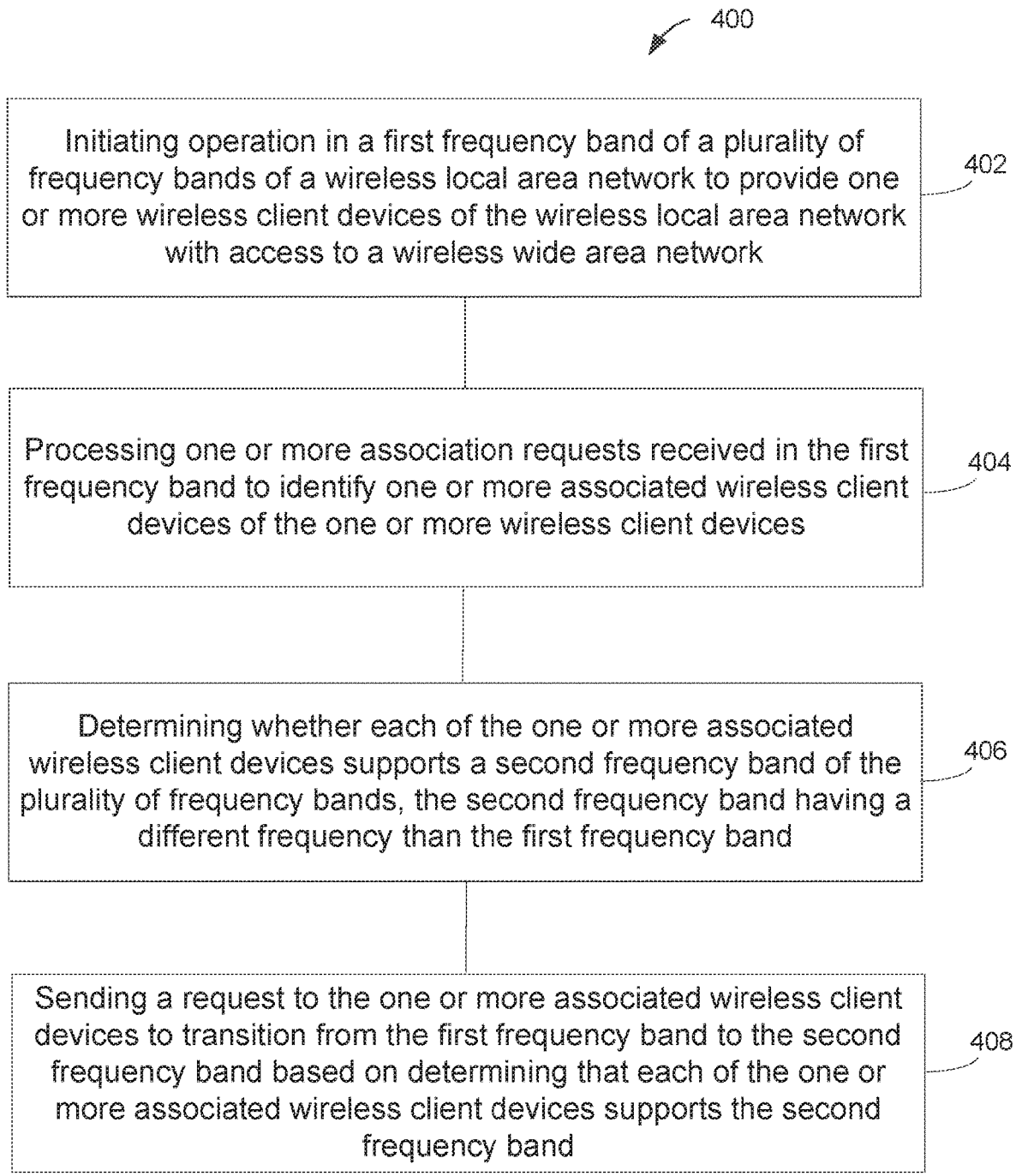
FIG. 4 illustrates another flow chart according to example aspects of the present disclosure.

FIG. 4 is another flowchart containing operations 400 that may be carried out in accordance with example implementations. Operations 400 shown in FIG. 4 could be executed by one or more computing devices, such as wireless access point 116 or wireless access point 126 or a different type of computing device operating as an access system for a wireless local area network. In some examples, operations 400 may be executed by a mobile hotspot device. Operations 400 may include one or more actions as illustrated by blocks 402-408. Although the blocks are illustrated in sequential order, these blocks may in some examples be performed in parallel, and/or in a different order than those described herein. Also, the various blocks may be combined into fewer blocks, divided into additional blocks, and/or removed based upon the directed implementation.

In addition, the operations 400 show functionality of some example implementations. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or RAM. The computer-readable medium may also include non-transitory media, such as secondary or persistent long-term storage, like ROM, optical or magnetic disks, and CD-ROM, for example. The computer-readable media may be considered a computer-readable storage medium, for example, or a tangible storage device. In addition, one or more blocks in FIG. 4 may represent circuitry that is wired to perform the specific logical operations.

Block 402 includes initiating operation in a first frequency band of a plurality of frequency bands of a wireless local area network to provide one or more wireless client devices of the wireless local area network with access to a wireless wide area network. In some examples, initiating operation in the first frequency band may involve selecting a first frequency channel in the first frequency band based on one or more scans of data traffic across different frequency channels of the first frequency band.

Block 404 includes processing one or more association requests received in the first frequency band to identify one or more associated wireless client devices of the one or more wireless client devices.

Block 406 includes determining whether each of the one or more associated wireless client devices supports a second frequency band of the plurality of frequency bands, the second frequency band having a different frequency than the first frequency band. In some examples, determining whether each of the one or more associated wireless client devices supports the second frequency band involves receiving one or more values in a capability field of each of the one or more associated wireless client devices. In some examples, determining whether each of the one or more associated wireless client devices supports the second frequency band involves determining whether the one or more associated wireless client devices previously associated to the access system and operated in the second frequency band while associated to the access system. In some examples, determining whether each of the one or more associated wireless client devices supports the second frequency band is performed a predetermined fixed amount of time after initiating operation in the first frequency band. In some examples, the first frequency band is a 2.4 GHz frequency band, and the second frequency band is a 5 GHz frequency band.

Block 408 includes sending a request to the one or more associated wireless client devices to transition from the first frequency band to the second frequency band based on determining that each of the one or more associated wireless client devices supports the second frequency band. In some examples, the request is sent by the access system when there is a lull in data transmission between each of the one or more associated wireless client devices and the access system. In some examples, the request is part of an announcement frame sent by the access system to the one or more associated wireless client devices after transitioning the access system from the first frequency band to the second frequency band.

Some examples further involve the access system obtaining a signal strength measurement from each of the one or more associated wireless client devices, and determining whether the signal strength measurement obtained from each of the one or more associated wireless client devices exceeds a predetermined received signal strength threshold. In some such examples, the request may be sent to the one or more associated wireless client devices to transition from the first frequency band to the second frequency band when the signal strength measurement obtained from each of the one or more associated wireless client devices is determined to exceed the predetermined received signal strength threshold. In some examples, the signal strength measurement received from each of the one or more associated wireless client devices is a RSSI measurement. In some examples, the signal strength measurement received from each of the one or more associated wireless client devices is a RCPI measurement.

Some examples further involve the access system transitioning from the second frequency band to the first frequency band when there is a lull in data transmission between each of the one or more associated wireless client devices and the access system. Such examples may also involve the access system identifying one or more other wireless client devices operating in the first frequency band that are requesting to join the wireless local area network, and determining whether the one or more other wireless client devices operating in the first frequency band operate exclusively in the first frequency band. Such examples may further involve the access system transitioning from the first frequency band to the second frequency band. Such examples may further involve the access system sending a request to the one or more associated wireless client devices operating in the second frequency band to transition from the second frequency band to the first frequency band when the one or more other wireless client devices were determined to operate exclusively in the first frequency band.

Some examples further involve the access system identifying an additional associated wireless client device failing to advertise whether the additional associated wireless client device supports the second frequency band. Such examples may further involve the access system transitioning from the first frequency band to the second frequency band and subsequently determining whether the additional associated wireless client device successfully connected to a channel in the second frequency band. Such examples may further involve the access system transitioning from the second frequency band to the first frequency band when the additional associated wireless client device failed to successfully connect to a channel in the second frequency band.

Some examples further involve the access system initiating operation in the second frequency band simultaneously with the operation in the first frequency band. Such examples may involve the access system terminating the simultaneous operation in the first frequency band and the second frequency band when each of the one or more associated wireless client devices is determined to have connected to a channel in the second frequency band, and continuing operation in the second frequency band after terminating the simultaneous operation in the first and second frequency bands. Such examples may also involve the access system identifying an associated wireless client device that maintains a connection to a channel in the first frequency band, and transitioning from the second frequency band to the first frequency band when there is the lull in data transmission between each associated wireless client device connected to a channel in the second frequency band and the access system.

In some examples, the access system may transition from the first frequency band to the second frequency band and subsequently initiate operation in the first frequency band simultaneously with the operation in the second frequency band. Such examples may further involve the access system identifying one or more other wireless client devices operating in the first frequency band that are requesting to join the wireless local area network, and subsequently sending a request to the one or more associated wireless client devices operating in the second frequency band to transition from the second frequency band to the first frequency band. In some such examples, initiating the operation in the first frequency band simultaneously with the operation in the second frequency band may be periodically performed after transitioning from the first frequency band to the second frequency band (e.g., for thirty seconds at ten minute intervals).

Notably, in some example systems, operation may be simultaneously initiated in two frequency bands, and each client device may be permitted to choose a frequency band to which the client device prefers to connect. However, in some cases, an access system may override a client device's decision. For example, a client device may be identified which connects or attempts to connect to a channel in a first frequency band. The access system may nonetheless determine that the client device is capable of connecting to a second frequency band. The access system may then request that the client device connects to the second frequency band, or the access system may attempt to steer such device to connect to the second frequency band by not responding to that client device's probe request on the first frequency band.

In some examples, the access system may only attempt to cause the client device to connect to the second frequency band if the client device also has sufficiently strong signal strength while connected to the first frequency band.

When one or more client devices are transitioned to a non-preferred frequency band in this manner, the access system may in some examples subsequently share time between two frequency bands. For example, the access system may periodically cycle between a first frequency band and a second frequency band, spending half the time operating in each frequency band. In this manner, the access system may provide multiple client devices with the opportunity to connect to their preferred frequency band for some fraction of time.

The example systems and methods described herein may also be employed for access systems supporting three or more frequency bands. For instance, an access system may support 2.4 GHz, 5 GHz, and 6 GHz frequency bands. After successfully transitioning one or more associated client devices to the 5 GHz frequency band, the access system may attempt to transition the associated client devices to the 6 GHz frequency band. This process may involve determining whether each associated client device supports the 6 GHz frequency band. Signal strength may also be considered, possibly with a different threshold than used to transition to the 5 GHz frequency band. In some examples, it may be assumed that client devices supporting a higher frequency band also support the lower frequency bands (e.g., a client device supporting 6 GHz may also be assumed to support 5 GHz and 2.4 GHz). Therefore, an access system may attempt to sequentially transfer client devices through each frequency band until a frequency band is reached which cannot support all of the client devices. The same process may also be employed for more than three frequency bands.

Figure 5:
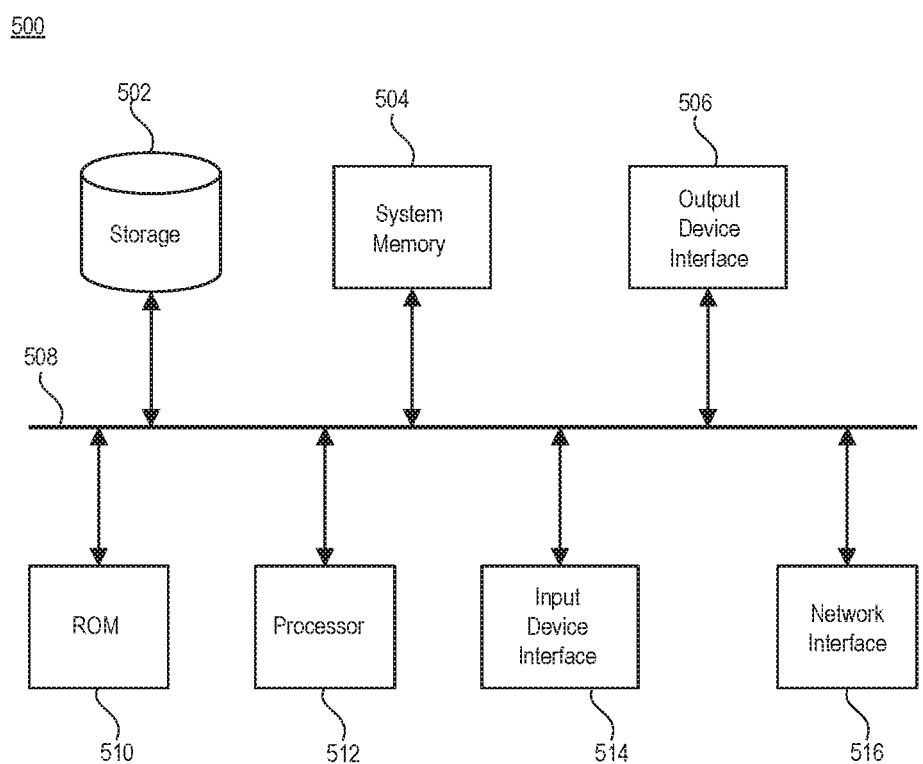
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a ROM 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502. Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for providing wireless network access. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as wireless client devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
   initiating, by an access system for a wireless local area network, operation in a first frequency band and a second frequency band simultaneously, wherein the first frequency band and the second frequency band provide one or more wireless client devices of the wireless local area network with access to a wireless wide area network;
   identifying, from the one or more wireless client devices, a wireless client device that attempts to connect to the first frequency band;
   determining that the identified wireless client device supports the second frequency band;
   subsequently requesting that the identified wireless client device connects to the second frequency band to access the wireless wide area network based at least in part on determining that the identified wireless client device supports the second frequency band;
   identifying an associated wireless client device that maintains a connection to a channel in the first frequency band;
   determining when there is a lull in data transmission between each associated wireless client device connected to a channel in the second frequency band and the access system; and
   transitioning, by the access system, from the second frequency band to the first frequency band when there is the lull in data transmission between each associated wireless client device connected to a channel in the second frequency band and the access system.

2. The method of claim 1, wherein determining that the identified wireless client device supports the second frequency band comprises determining that the identified wireless client device previously associated to the access system and operated in the second frequency band while associated to the access system.

3. The method of claim 1, wherein initiating operation in the first frequency band comprises selecting a first frequency channel in the first frequency band based on one or more scans of data traffic across different frequency channels of the first frequency band.

4. The method of claim 1, wherein determining that the identified wireless client device supports the second frequency band comprises:
   receiving one or more values in a capability field of the identified wireless client device.

5. The method of claim 1, further comprising:
   obtaining a signal strength measurement from the identified wireless client device; and
   determining whether the signal strength measurement obtained from the identified wireless client device exceeds a predetermined received signal strength threshold,
   wherein requesting that the identified wireless client device connects to the second frequency band to access the wireless wide area network is further based on determining that the signal strength measurement obtained from the identified wireless client device exceeds the predetermined received signal strength threshold.

6. The method of claim 5, wherein the signal strength measurement received from the identified wireless client device is a received signal strength indicator (RSSI) measurement.

7. The method of claim 5, wherein the signal strength measurement received from the identified wireless client device is a received channel power indicator (RCPI) measurement.

8. The method of claim 1, wherein requesting that the identified wireless client device connects to the second frequency band to access the wireless wide area network is performed by the access system when there is a lull in data transmission between the identified wireless client device and the access system.

9. The method of claim 1, further comprising:
   identifying one or more other wireless client devices operating in the first frequency band that are requesting to join the wireless local area network;
   determining whether the one or more other wireless client devices operating in the first frequency band operate exclusively in the first frequency band; and
   requesting that the one or more other wireless client devices connect to the second frequency band to access the wireless wide area network based at least in part on determining that the one or more other wireless client devices do not operate exclusively in the first frequency band.

10. The method of claim 1, wherein determining that the identified wireless client device supports the second frequency band is performed a predetermined fixed amount of time after initiating operation in the first frequency band.

11. The method of claim 1, wherein the first frequency band is a 2.4 GHz frequency band, wherein the second frequency band is a 5 GHz frequency band.

12. The method of claim 1, further comprising:
   terminating the simultaneous operation in the first frequency band and the second frequency band when each of the one or more wireless client devices is determined to have connected to a channel in the second frequency band; and
   continuing operation in the second frequency band after terminating the simultaneous operation in the first and second frequency bands.

13. The method of claim 1, further comprising:
   identifying one or more other wireless client devices operating in the first frequency band that are requesting to join the wireless local area network; and
   subsequently sending a request to the identified wireless client device operating in the second frequency band to transition from the second frequency band to the first frequency band.

14. The method of claim 1, further comprising causing the access system to cycle between the first frequency band and the second frequency band based on identifying the wireless client device that attempts to connect to the first frequency band.

15. The method of claim 1, further comprising:
determining that the identified wireless client device has connected to the second frequency band;
subsequently determining whether the identified wireless client device supports a third frequency band, the third frequency band having a different frequency than the first frequency band and the second frequency band; and
sending a request to the identified wireless client device to transition from the second frequency band to the third frequency band based on determining that the identified wireless client device supports the third frequency band.

16. An access system for a wireless local area network, the access system comprising:
one or more processors; and
a machine-readable medium comprising instructions stored therein, which when executed by the one or more processors, cause the one or more processors to perform operations comprising:
initiating, by the access system for the wireless local area network, operation in a first frequency band and a second frequency band simultaneously, wherein the first frequency band and the second frequency band provide one or more wireless client devices of the wireless local area network with access to a wireless wide area network;
identifying, from the one or more wireless client devices, a wireless client device that attempts to connect to the first frequency band;
determining that the identified wireless client device supports the second frequency band;
subsequently requesting that the identified wireless client device connects to the second frequency band to access the wireless wide area network based at least in part on determining that the identified wireless client device supports the second frequency band;
identifying an associated wireless client device that maintains a connection to a channel in the first frequency band;
determining when there is a lull in data transmission between each associated wireless client device connected to a channel in the second frequency band and the access system; and
transitioning, by the access system, from the second frequency band to the first frequency band when there is the lull in data transmission between each associated wireless client device connected to a channel in the second frequency band and the access system.

17. The access system of claim 16, wherein the operations further comprise causing the access system to cycle between the first frequency band and the second frequency band based on identifying the wireless client device that attempts to connect to the first frequency band.

18. A non-transitory computer-readable medium storing instructions therein that, when executed by one or more processors, cause the one or more processors to perform operations comprising:
initiating, by an access system for a wireless local area network, operation in a first frequency band and a second frequency band simultaneously, wherein the first frequency band and the second frequency band provide one or more wireless client devices of the wireless local area network with access to a wireless wide area network;
identifying, from the one or more wireless client devices, a wireless client device that attempts to connect to the first frequency band;
determining that the identified wireless client device supports the second frequency band;
subsequently requesting that the identified wireless client device connects to the second frequency band to access the wireless wide area network based at least in part on determining that the identified wireless client device supports the second frequency band;
identifying an associated wireless client device that maintains a connection to a channel in the first frequency band;
determining when there is a lull in data transmission between each associated wireless client device connected to a channel in the second frequency band and the access system; and
transitioning, by the access system, from the second frequency band to the first frequency band when there is the lull in data transmission between each associated wireless client device connected to a channel in the second frequency band and the access system.

19. The non-transitory computer-readable medium of claim 18, wherein the operations further comprise causing the access system to cycle between the first frequency band and the second frequency band based on identifying the wireless client device that attempts to connect to the first frequency band.

* * * * *